United States Patent
Lin et al.

(10) Patent No.: US 12,229,590 B2
(45) Date of Patent: Feb. 18, 2025

(54) DEVICE AND METHOD OF PERFORMING CONTENT CHANNEL GENERATION

(71) Applicant: Realtek Semiconductor Corp., HsinChu (TW)

(72) Inventors: Jhe-Yi Lin, HsinChu (TW); Chun-Kai Tseng, HsinChu (TW); Wen-Yung Lee, HsinChu (TW); Shau-Yu Cheng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 621 days.

(21) Appl. No.: 17/211,852

(22) Filed: Mar. 25, 2021

(65) Prior Publication Data

US 2021/0349754 A1    Nov. 11, 2021

(30) Foreign Application Priority Data

May 8, 2020 (TW) .................. 109115384

(51) Int. Cl.
  *G06F 9/48*    (2006.01)
  *G06F 9/30*    (2018.01)
  (Continued)

(52) U.S. Cl.
  CPC .......... *G06F 9/4881* (2013.01); *G06F 9/3001* (2013.01); *G06F 9/505* (2013.01); *G06F 16/9027* (2019.01)

(58) Field of Classification Search
  CPC ............. G06F 9/4881; G06F 160/9027; G06F 9/3001; G06F 9/505
  See application file for complete search history.

(56) References Cited

U.S. PATENT DOCUMENTS

| 6,912,229 | B1 | 6/2005 | Lauro |
| 7,260,716 | B1 | 8/2007 | Srivastava |
| 2017/0094664 | A1* | 3/2017 | Lee ..................... H04L 5/0028 |

FOREIGN PATENT DOCUMENTS

| TW | 201713160 A | 4/2017 |
| TW | 202143770 A | 11/2021 |
| WO | 2021/204209 A1 | 10/2021 |

OTHER PUBLICATIONS

Su et al., the specification, including the claims, and drawings in the U.S. Appl. No. 18/143,048, Filing Date: May 3, 2023.
(Continued)

*Primary Examiner* — Wissam Rashid
(74) *Attorney, Agent, or Firm* — Winston Hsu (57) ABSTRACT

A content channel generation device comprises a resource unit assignment circuit, for assigning scheduled station(s) as node(s) of a full binary tree according to a search algorithm; a node computing circuit, for determining first node connection information of the full binary tree, and to determine second node connection information of a smallest full binary tree according to a smallest binary tree algorithm and the first node connection information; a load balance circuit, for determining user field numbers corresponding to content channels according to a load balance function and the second node connection information; a user field generation circuit, for generating a traversal result of the smallest full binary tree according to a traversal algorithm and the second node connection information, and for generating user fields corresponding to the content channels according to the traversal result, to generate the content channels.

10 Claims, 7 Drawing Sheets

(51) Int. Cl.
*G06F 9/50* (2006.01)
*G06F 16/901* (2019.01)

(56) References Cited

OTHER PUBLICATIONS

Lin et al., the specification, including the claims, and drawings in the U.S. Appl. No. 18/143,081, Filing Date: May 4, 2023.

* cited by examiner

DEVICE AND METHOD OF PERFORMING CONTENT CHANNEL GENERATION

BACKGROUND OF THE INVENTION

1. Field of the Invention

The present invention relates to a device and a method used in a communication system, and more particularly, to a device and a method of performing content channel generation.

2. Description of the Prior Art

In a communication system, a transmitter obtains user fields for assigning user resources according to a sorting algorithm and a linked list. However, the sorting algorithm and the linked list are with high complexities (e.g., time complexity), such that it is difficult to implement the sorting algorithm and the linked list in an embedded system. In addition, the user fields obtained according to the sorting algorithm and the linked list are with a variable length. However, the user fields with a long length may reduce efficiency of bandwidth usage. Thus, how to design an algorithm with a low complexity to obtain user fields with a short length and to generate content channels with a short length is an important issue to be solved.

SUMMARY OF THE INVENTION

The present invention therefore provides a device and a method of performing content channel generation, to solve the abovementioned problem.

A content channel generation device, comprises a resource unit assignment circuit, for assigning at least one scheduled station as at least one node of a full binary tree according to a search algorithm; a node computing circuit, coupled to the resource unit assignment circuit, for determining first node connection information of the full binary tree, and to determine second node connection information of a smallest full binary tree according to a smallest binary tree algorithm and the first node connection information; a load balance circuit, coupled to the node computing circuit, for determining a plurality of user field numbers corresponding to a plurality of content channels according to a load balance function and the second node connection information; and a user field generation circuit, coupled to the load balance circuit and the node computing circuit, for generating a traversal result of the smallest full binary tree according to a traversal algorithm and the second node connection information, and for generating a plurality of user fields corresponding to the plurality of content channels according to the traversal result, to generate the plurality of content channels.

A content channel generation method for a content channel generation device comprises assigning at least one scheduled station as at least one node of a full binary tree according to a search algorithm; determining first node connection information of the full binary tree, and determining second node connection information of a smallest full binary tree according to a smallest binary tree algorithm and the first node connection information; determining a plurality of user field numbers corresponding to a plurality of content channels according to a load balance function and the second node connection information; generating a traversal result of the smallest full binary tree according to a traversal algorithm and the second node connection information, and generating a plurality of user fields corresponding to the plurality of content channels according to the traversal result, to generate the plurality of content channels.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
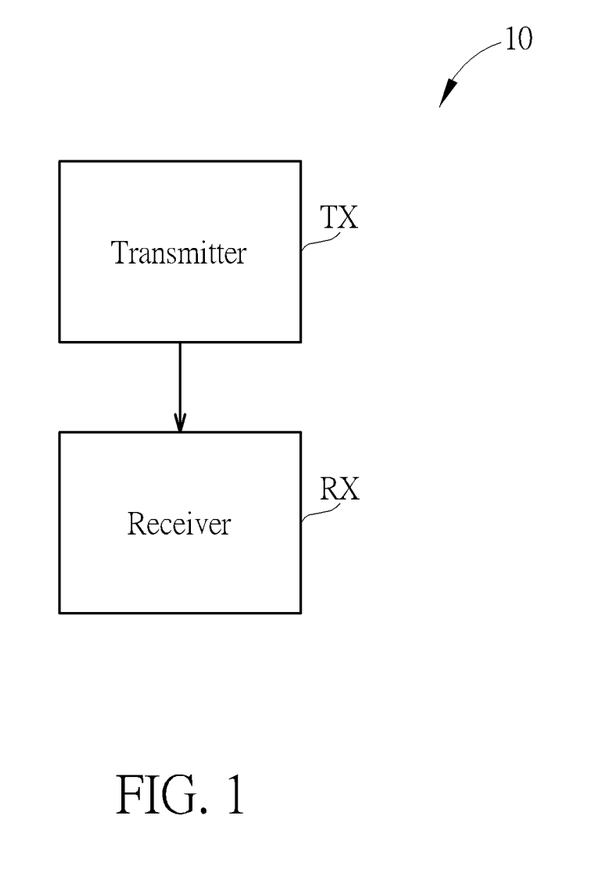
FIG. 1 is a schematic diagram of a communication system according to an example of the present invention.

FIG. 1 is a schematic diagram of a communication system 10 according to an example of the present invention. The communication system 10 may be any communication system using an orthogonal frequency-division multiplexing (OFDM) technique (or termed as discrete multi-tone modulation (DMT) technique), and is briefly composed of a transmitter TX and a receiver RX. In FIG. 1, the transmitter TX and the receiver RX are simply utilized for illustrating the structure of the communication system 10. For example, the communication system 10 may be any wired communication system such as an asymmetric digital subscriber line (ADSL) system, a power line communication (PLC) system or an Ethernet over coax (EOC), or may be any wireless communication system such as a wireless local area network (WLAN), a Digital Video Broadcasting (DVB) system, a Long Term Evolution (LTE) system, a Long Term Evolution-advanced (LTE-A) system or a 5th generation (5G) system. For example, the transmitter TX may be an access point (AP) in the WLAN. In addition, the transmitter TX and the receiver RX may be installed in a device such as a mobile phone, a laptop, a tablet computer, etc., and are not limited herein.

In one example, the transmitter TX and the receiver RX may support the Institute of Electrical and Electronics Engineers (IEEE) 802.11 standard (e.g., IEEE 802.11g, n, ac, ax, etc.). In one example, the 802.11 standard may support an Orthogonal Frequency Division Multiple Access (OFDMA) and/or a Multi-User Multiple-Input Multiple-Output (MU-MIMO). For efficiently notifying information of transmission of all scheduled stations to the receiver RX, the IEEE 802.11 standard defines a field of a high efficiency multi-user physical protocol data unit (HE-MU PPDU) (e.g., a HE-SIG-B field). In one example, the HE-SIG-B field may include at least one content channel. Each content channel may include a plurality of common fields, for notifying a current resource unit assignment of all data bandwidths to all the scheduled stations. In one example, each content channel may include at least one user field. Each user field may carry information of transmission of a specific station. In one example, in the IEEE 802.11 standard, each resource unit which is smaller than a 242-tone may (e.g., should) be assigned with at least one station. Thus, for an empty resource unit, the HE-SIG-B field may assign an empty station with a station identity (ID) of "2046". For each resource unit which is greater than or equal to the 242-tone, the HE-SIG-B field may assign the at least one user field to a plurality of content channels, to ensure that a plurality of user field numbers carried by the plurality of content channels (i.e., the number of the user fields carried by each content channel, the lengths (e.g., sizes) of the content channels) are the same of similar. In one example, a load balance may be used for balancing the lengths of the plurality of content channels. According to a result of the resource unit assignment and a result of the load balance, a length of the HE-SIG-B field may be changed. In one example, the HE-SIG-B field with a long length may cause a Physical Layer Convergence Procedure (PLCP) having a long length, and a throughput may be decreased.

In one example, the resource unit assignment may be used for searching an optimal combination of resource unit assignments via equally dividing data bandwidths. A lowest complexity may be obtained and more empty resource units may be generated, such that the at least one user field (e.g., the specific user field) may be long, and the throughput may be decreased. In one example, the resource unit assignment may be used for searching an optimal combination of resource unit assignments via an exhaustive searching. The optimistic combination of the resource unit assignments may be obtained by the exhaustive searching. The exhaustive searching may be increased according to an increasing of data bandwidths and an increasing of searching spaces, such that a complexity and an executed time of the exhaustive searching are greatly increased. It is difficult to meet the immediate requirements in practical applications. In one example, when generating the at least one user field, an order of the at least one user field may (e.g., should) be arranged from the most negative frequency to the most positive frequency according to bandwidth positions of the assigned data units. Thus, the order of the at least one user field is commonly implemented by using a linked list combined with a sorting algorithm. However, the linked list and the sorting algorithm have high complexities. Thus, for an embedded system (e.g., AP), long executed time are required. It is difficult to meet the immediate requirements in practical applications.

Figure 2:
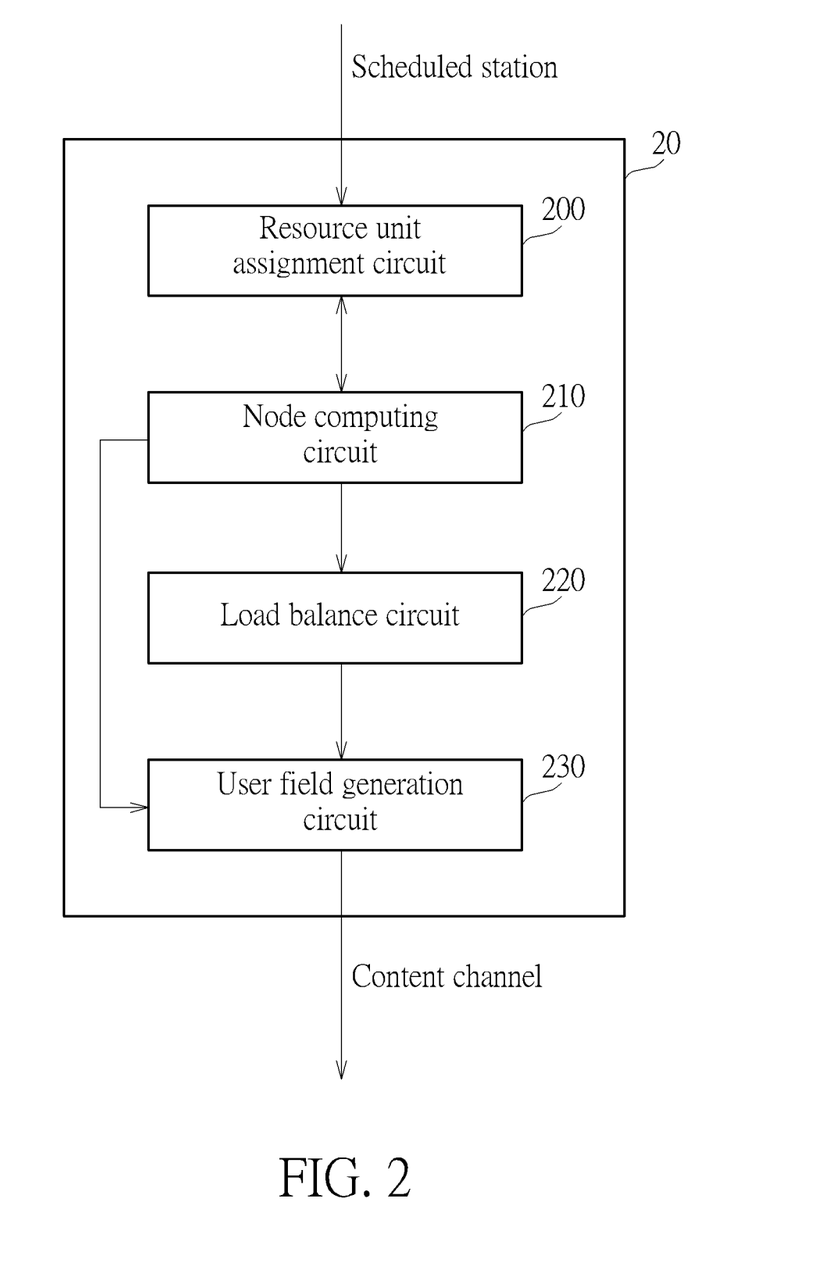
FIG. 2 is a schematic diagram of a content channel generation device according to an example of the present invention.

FIG. 2 is a schematic diagram of a content channel generation device 20 according to an example of the present invention. The content channel generation device 20 may be utilized in the transmitter TX of FIG. 1, for generating user fields and content channels. In one example, the content channels may be included in the HE-SIG-B field. In one example, the HE-SIG-B field may include the content channels. In one example, the content channels may include at least one first content channel and at least one second content channel. In one example, each content channel may include at least one common field and/or at least one user field. In one example, the common field may be used for notifying a current resource unit assignment of a spectrum to a user equipment (UE). In one example, the user field may be used for notifying assigned resource to the UE or the station. In one example, if a resource unit with the smallest size is determined as a leaf node and its adjacent resource unit is determined as a sibling node, according to a rule that a size of a resource unit of a child node is not greater than a size of a resource unit of a parent node, the content channel generation device 20 (e.g., a node computing circuit 210 of it) may built (e.g., determine, generate) a binary tree, and each resource unit may be corresponding to a node of the binary tree. In one example, the node may be corresponding to at least one user field. That is, each resource unit may be corresponding to one or more user fields.

The content channel generation device 20 may include a resource unit assignment circuit 200, the node computing circuit 210, a load balance circuit 220 and a user field generation circuit 230. In detail, the resource unit assignment circuit 200 may be used for assigning (e.g., allocating, locating) at least one scheduled station as at least one node of a full binary tree according to a search algorithm. The node computing circuit 210, coupled to the resource unit assignment circuit 200, may include a node pool, and may be used for determining (e.g., recording) first node connection information of the full binary tree (e.g., current existing node(s)). The node computing circuit 210 may be used for storing (e.g., including) a smallest binary tree algorithm, to determine (e.g., calculate or update) second node connection information of a smallest full binary tree (e.g., may be generated by non-empty node(s) in the node pool (i.e., non-empty node(s) in the full binary tree)) according to the smallest binary tree algorithm and the first node connection information. The load balance circuit 220, coupled to the node computing circuit 210, may be used for determining (e.g., calculating) a plurality of user field numbers corresponding to a plurality of content channels (e.g., the number of user fields may be (e.g., will be) carried by each content channel) according to a load balance function and the second node connection information. The user field generation circuit 230, coupled to the load balance circuit 220 and the node computing circuit 210, may be used for generating a traversal result of the smallest full binary tree according to a traversal algorithm and the second node connection information, and may be used for generating a plurality of user fields corresponding to the plurality of content channels according to the traversal result, to generate (e.g., compose, form) the plurality of content channels. In one example, the plurality of user field numbers refer to a plurality of "the number of the user fields" (e.g., the number of the user fields of the first content channel and the number of the user fields of the second content channel).

In one example, the node pool may include a memory unit (e.g., a static random access memory (SRAM) or a register file), and may be used for storing node connection information. In one example, the smallest binary tree algorithm may include a merge algorithm. The merge algorithm may be used for determining (e.g., calculating) the smallest full binary tree including all nodes (e.g., in the node pool) according to the first node connection information of the node pool.

In one example, the search algorithm may include a binary tree search algorithm (e.g., a depth first search algorithm). In one example, the at least one node may include (e.g., be) at least one non-empty node. In one example, the resource unit assignment circuit 200 may assign a plurality of empty stations as a plurality of empty leaf nodes of the full binary tree according to the search algorithm and the at least one non-empty node, such that the nodes in the node pool may form a full binary tree. In one example, the node computing circuit 210 may merge a first empty leaf node of at least one empty leaf nodes into the at least one non-empty node, if a first parent node connected with the first empty leaf node is the at least one non-empty node. In one example, the node computing circuit 210 may merge a second empty leaf node of the at least one empty leaf nodes into a second parent node connected with the second empty leaf node and may determine the second parent node as a first assigned empty node, if the second parent node is not the at least one non-empty node and the second parent node does not connect to the at least one non-empty node. In one example, the node computing circuit 210 may determine a third empty leaf node of the at least one empty leaf nodes connected with a third parent node as a second assigned empty node, if the third parent node is not the at least one non-empty node and the third parent node connects to the at least one non-empty node. In one example, the node computing circuit 210 may determine the smallest full binary tree (e.g., may store node connection information of the smallest full binary tree) according to the at least one non-empty node and the at least one empty leaf node. In one example, the node computing circuit 210 may determine (e.g., store) the smallest full binary tree and its node connection information according to the at least one non-empty node and at least one assigned empty node (e.g., the first assigned empty node and/or the second assigned empty node).

In one example, the plurality content channels may include at least one first content channel and at least one second content channel. In one example, the at least one first content channel may include at least one first user field of the plurality of user fields, and the at least one second content channel may include at least one second user field of the plurality of user fields. In one example, the at least one first content channel or the at least one second content channel may not include the user fields. In one example, a plurality of nodes may be corresponding to a plurality of resource units. In one example, a resource unit of the plurality of resource units may be corresponding to at least one user field. That is, each resource unit may be corresponding to (e.g., signaled to) one or more user fields.

In one example, the traversal algorithm may include a binary tree pre-order traversal algorithm. In one example, the traversal algorithm may include a binary tree mirrored pre-order traversal algorithm. In one example, an order of a plurality of frequencies corresponding to the plurality of user fields may be an ascending order. That is, the order of the plurality of frequencies corresponding to the plurality of user fields may be arranged from the smallest frequency to the greatest frequency (e.g., the most negative frequency to the most positive frequency).

Figure 3:
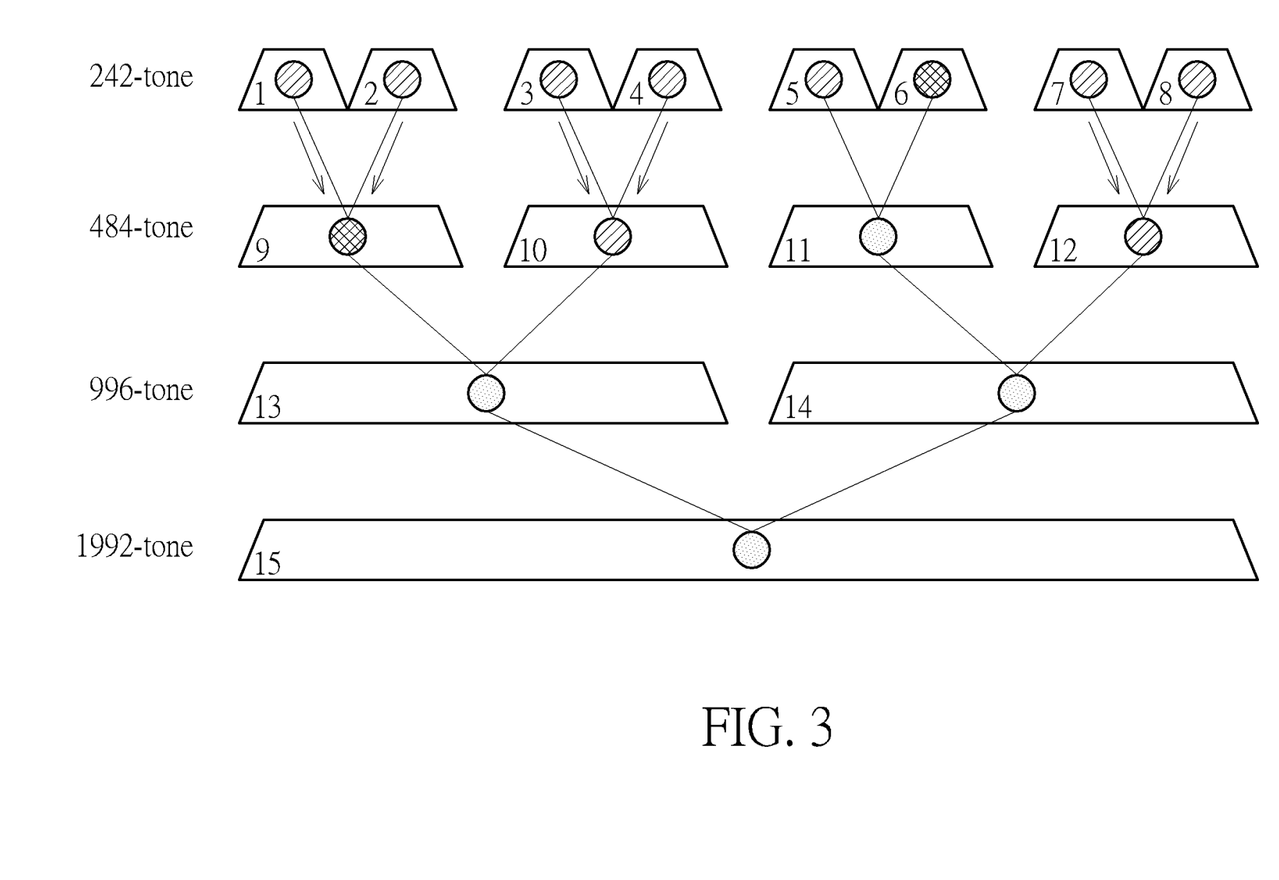
FIG. 3 is a schematic diagram of a correspondence of a resource unit and a node of a full binary tree according to an example of the present invention.

FIG. 3 is a schematic diagram of a correspondence of a resource unit and a node of a full binary tree according to an example of the present invention. In FIG. 3, the resource units are illustrated as trapezoids. Take a 160 MHz bandwidth as an example, from the top to the bottom, there are eight 242-tone (e.g., including 242 subcarriers) resource units, four 484-tone (e.g., including 484 subcarriers) resource units, two 996-tone (e.g., including 996 subcarriers) resource units, and one 1992-tone (e.g., including 1992 subcarriers) resource unit. The processing procedures for resource units smaller than 242-tone are similar to the processing procedures for the resource units greater than 242-tone, and are not repeated herein. A resource unit has a resource unit index (e.g., defined in the third Generation Partnership Project (3GPP) standard, determined by the transmitter TX, or defined by WiFi (e.g., WiFi-6), and is illustrated as indexes 1-15 in FIG. 3. In addition, in FIG. 3, the full binary tree is illustrated as a tree structure, which include circles filled with diagonal stripes (hereinafter referred to as diagonal-stripes circles), circles filled with grids (hereinafter referred to as grid circles), and circles filled with dots (hereinafter referred to as dot circles) and connecting lines between the circles. The diagonal-stripes circles represent empty nodes, the grid circles represent scheduled stations or assigned nodes, and the dot circles represent reserved nodes. Arrows illustrated in FIG. 3 represent a node being merged into another node. The tree structure of the merged nodes may (e.g., should) satisfy a structure of a full binary tree. As shown in FIG. 3, the relations between the resource units and the nodes of the full binary tree are one-to-one correspondences, i.e., a resource unit is corresponding to a node of the full binary tree.

Figure 4:
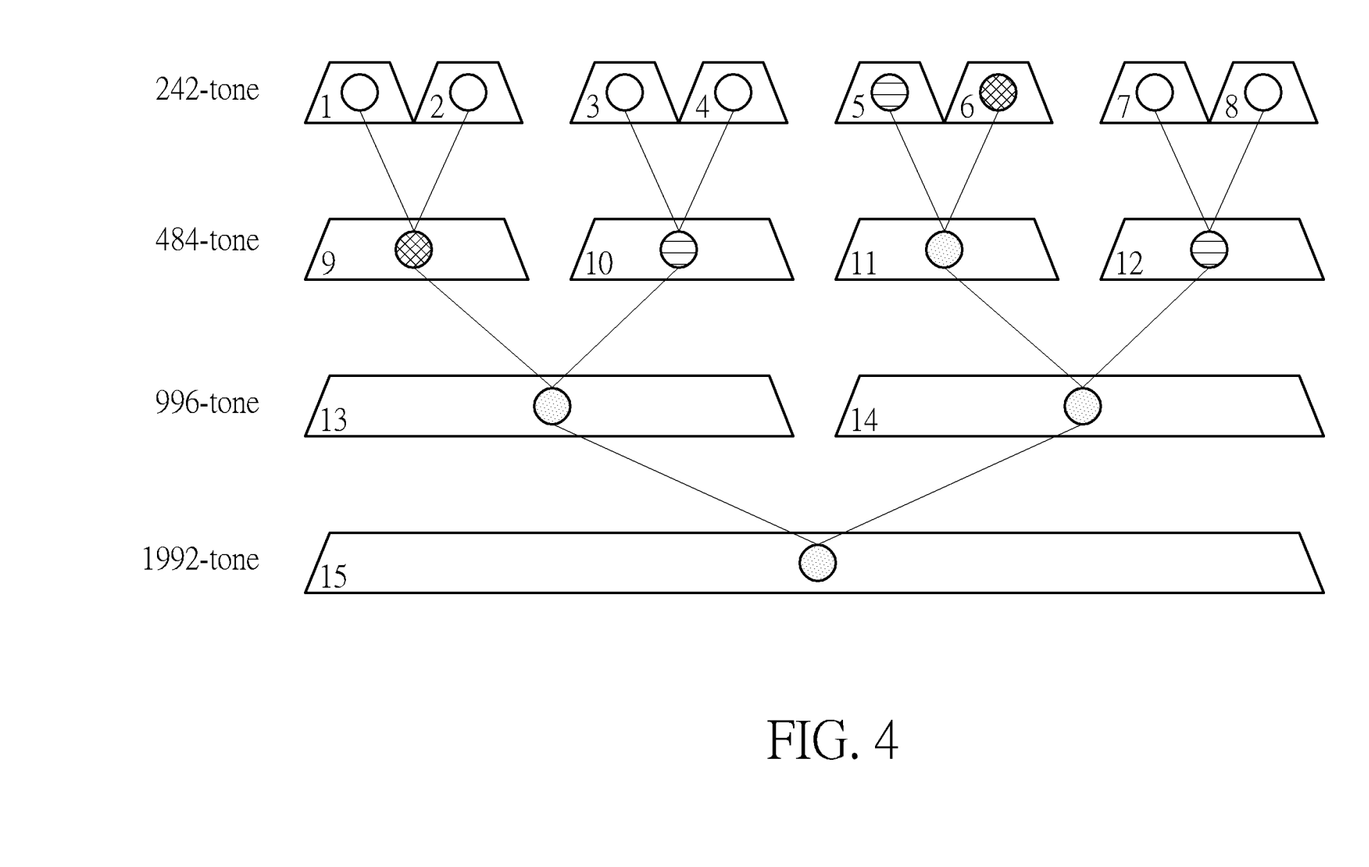
FIG. 4 is a schematic diagram of a correspondence of a resource unit and a node of a full binary tree according to an example of the present invention.

FIG. 4 is a schematic diagram of a correspondence of a resource unit and a node of a full binary tree according to an example of the present invention. In FIG. 4, resource units and their indexes are illustrated the same as those in FIG. 3, and are not repeated herein. Different from FIG. 3, the full binary tree includes empty circles, grid circles, circles filled with horizontal-stripes (hereinafter referred to as horizontal-stripes circles), dot circles and connecting lines between the circles. The empty circles represent empty leaf nodes, the grid circles represent scheduled stations or assigned nodes, the horizontal-stripes circles represent empty nodes being assigned as empty stations, and the dot circles represent reserved nodes. Finally, the remaining nodes may generate a full binary tree after removing (e.g., deleting) the empty leaf nodes.

The following example is used for illustrating how the content channel generation device 20 generates the content channel according to FIG. 3 and FIG. 4.

First, the resource unit assignment circuit 200 receives scheduled stations 6 and 9 transmitted from an upper layer (e.g., Media Access Control (MAC) layer). The resource unit assignment circuit 200 assigns the scheduled stations 6 and 9 as nodes corresponding to resource unit indexes 6 and 9 in the full binary tree (i.e., the grid circles in FIG. 3) according to the search algorithm, wherein connection information of the nodes are stored in the node pool of the node computing circuit 210. For simplifying the description, a node corresponding to a resource unit index X is termed as node X.

The resource unit assignment circuit 200 assigns a plurality of empty stations as a plurality of empty leaf nodes, i.e., nodes 1-5, 7 and 8 (i.e., the diagonal-stripes circles in FIG. 3), according to the search algorithm and the nodes 6 and 9, such that the nodes in the node pool may form a full binary tree.

According to the smallest full binary tree algorithm, a first parent node of the nodes 1 and 2 is the node 9, the node computing circuit 210 merges the nodes 1 and 2 into the node 9 (i.e., the arrow direction in FIG. 3). According to the smallest full binary tree algorithm, a second parent node of the nodes 3 and 4 is the node 10 rather than the node 6 or 9, and the node 10 does not connect to the node 6 or 9, the node computing circuit 210 merges the nodes 3 and 4 into the node 10 (i.e., the arrow direction in FIG. 3). Then, the node computing circuit 210 determines the node 10 as an assigned empty node (i.e., the horizontal-stripes circle in FIG. 4), such that a tree structure of the nodes satisfies a structure of a binary tree (e.g., a full binary tree). Similarly, according to the smallest full binary tree algorithm, a third parent node of the nodes 7 and 8 is the node 12 rather than the node 6 or 9, and the node 12 does not connect to the node 6 or 9, the node computing circuit 210 merges the nodes 7 and 8 into the node 12 (i.e., the arrow direction in FIG. 3).

Then, the node computing circuit 210 determines the node 12 as an assigned empty node (i.e., the horizontal-stripes circle in FIG. 4), such that the tree structure of the nodes satisfies a structure of a binary tree (e.g., a full binary tree). In addition, according to the smallest full binary tree algorithm, a fourth parent node of the node 5 is the node 11 rather than the node 6 or 9, but the node 11 connects to the node 6, the node computing circuit 210 determines the node 5 as an assigned empty node (i.e., the horizontal-stripes circle in FIG. 4), such that the tree structure of the nodes satisfies a structure of a binary tree (e.g., a full binary tree). According to the above search algorithm, the resource unit assignment circuit 200 assigns the scheduled stations as the node 6 and 9 of the full binary tree. According to the smallest full binary tree algorithm, the node computing circuit 210 merges the assigned empty stations (i.e., the nodes 1-5, 7 and 8) into the assigned empty nodes 5, 10 and 12. For simplifying the description, the nodes 6 and 9 and the assigned empty nodes 5, 10 and 12 are termed as assigned nodes.

Next, the load balance circuit 220 determines (e.g., calculates) at least one user field of the assigned nodes corresponding to the first content channel and/or the second content channel according to a load balance function. That is, each assigned node may be corresponding to (e.g., signaling to) one or more user fields. First, the load balance function is defined as follows:

$$\min_{\{x_i\},\{y_i\}} \max\left(\sum_{i\in L} x_i + C_1, \sum_{j\in L} y_j + C_2\right)$$

$$\text{s.t. } x_i + y_i = N_i,$$

$$\forall i \in L$$

$$x_i \in N,$$

$$\forall i \in L$$

$$y_i \in N,$$

$$\forall i \in L$$

where L refers to a resource unit index of a resource unit, which has the number of tones (e.g., subcarrier) greater or equal to 484 (e.g., 484 or 996). $N_i$ is the number of user fields assigned (e.g., configured) to the resource unit i. $x_i$ is the number of user fields of the first content channel assigned (e.g., configured) to the resource unit i. $y_i$ is the number of user fields of the second content channel assigned (e.g., configured) to the resource unit i. $C_1$ is the number of user fields of the first content channel of a resource unit, which has the number of tones (e.g., subcarrier) smaller or equal to 242 (e.g., 26, 52, 106 or 242). $C_2$ is the number of user fields of the second content channel of a resource unit, which has the number of tones (e.g., subcarrier) smaller or equal to 242 (e.g., 26, 52, 106 or 242); N is a natural number.

The following example is used for illustrating how to determine at least one user field of the assigned nodes corresponding to the first content channel and/or the second content channel according to the load balance function. First, the number of the user field of the assigned node 5 is 1 ($N_5=1$), the number of the user field of the assigned node 6 is 1 ($N_6=1$), the number of the user fields of the assigned node 9 is 2 ($N_9=2$), the number of the user fields of the assigned node 10 is 2 ($N_{10}=2$), and the number of the user fields of the assigned node 12 is 2 ($N_{12}=2$). That is, the number of the user fields of the assigned nodes is 8.

According to the load balance function, when the user field of the assigned node 5 is corresponding to the first content channel and the user field of the assigned node 6 is corresponding to the second content channel, or when the user field of the assigned node 5 is corresponding to the second content channel and the user field of the assigned node 6 is corresponding to the first content channel, $C_1=1$ and $C_2=1$. When the user fields of the assigned nodes 9, 10 and 12 are corresponding to the first content channel, $\Sigma_{i\in L}x_i+C_1=7$, $\Sigma_{j\in L}y_j+C_2=1$, and $\max(\Sigma_{i\in L}x_i+C_1, \Sigma_{j\in L}y_j+C_2)=7$. When the user fields of the assigned node 9 (of the user fields of the assigned nodes 9, 10 and 12) are corresponding to the second content channel, and other user fields (of the user fields of the assigned nodes 9, 10 and 12) are corresponding to the first content channel, $\Sigma_{i\in L}x_i=5$, $\Sigma_{j\in L}y_j+C_2=3$, and $\max(\Sigma_{i\in L}x_i+C_1, \Sigma_{j\in L}y_j+C_2)=5$. When one of the user fields of the assigned node 9 and one of the user fields of the assigned node 10 (of the user fields of the assigned nodes 9, 10 and 12) are corresponding to the second content channel, and other user fields (of the user fields of the assigned nodes 9, 10 and 12) are corresponding to the first content channel, $\Sigma_{i\in L}x_i+C_1=5$, $\Sigma_{i\in L}y_j+C_2=3$, and $\max(\Sigma_{i\in L}x_i+C_1, \Sigma_{j\in L}y_j+C_2)=5$. When one of the user fields of the assigned node 9, one of the user fields of the assigned node 10 and one of the user fields of the assigned node 12 (of the user fields of the assigned nodes 9, 10 and 12) are corresponding to the second content channel, and other user fields (of the user fields of the assigned nodes 9, 10 and 12) are corresponding to the first content channel, $\Sigma_{i\in L}x_i+C_1=4$, $\Sigma_{j\in L}y_j+C_2=4$, and $\max(\Sigma_{i\in L}x_i+C_1, \Sigma_{j\in L}y_j+C_2)=4$. When the user fields of the assigned node 9, one of the user fields of the assigned node 10 and one of the user fields of the assigned node 12 (of the user fields of the assigned nodes 9, 10 and 12) are corresponding to the second content channel, and other user fields (of the user fields of the assigned nodes 9, 10 and 12) are corresponding to the first content channel, $\Sigma_{i\in L} x_i+C_1=3$, $\Sigma_{j\in L}y_j+C_2=5$, and $\max(\Sigma_{i\in L} x_i+C_1, \Sigma_{j\in L}y_j+C_2)=5$. When the user fields of the assigned node 9, one of the user fields of the assigned node 10 and the user fields of the assigned node 12 (of the user fields of the assigned nodes 9, 10 and 12) are corresponding to the second content channel, and other user fields (of the user fields of the assigned nodes 9, 10 and 12) are corresponding to the first content channel, $\Sigma_{i\in L}x_i+C_1=2$, $\Sigma_{j\in L}y_j+C_2=6$, and $\max(\Sigma_{i\in L}x_i+C_1, \Sigma_{j\in L}y_j+C_2)=6$. In the above maximum values 4-7, the minimum value is 4. Thus, according to the load balance function, in the situation that the number of the user fields carried by the first content channel is 4 and the number of the user fields carried by the second content channel is 4, the HE-SIG-B field with the shortest length can be obtained because the length of the HE-SIG-B field is based on a content channel which carries more user fields. Thus, in the situation that the minimum value is already shown, all the correspondences between the user fields and the first content channel and/or the second content channel are not described one by one.

The above correspondence with the minimum value of 4 is one of the correspondences, but is not limited herein. The above correspondence with the minimum value of 4 is that: when the one of the user fields of the assigned node 9, the one of the user fields of the assigned node 10 and the one of the user fields of the assigned node 12 (of the user fields of the assigned nodes 9, 10 and 12) are corresponding to the second content channel, and other user fields (of the user fields of the assigned nodes 9, 10 and 12) are corresponding to the first content channel. The above correspondence (assignment) may satisfy the condition of the load balance function.

Further, the user field generation circuit 230 may generate a traversal result of the full binary tree according to a traversal algorithm according to the search algorithm. Please refer to FIG. 4, only the reserved nodes (i.e., the dot circles in FIG. 4) and the assigned nodes (i.e., the grid circles and the horizontal-stripes circles in FIG. 4) are traversed, the nodes 1-4, 7 and 8 (i.e., the empty circles in FIG. 4) are not traversed. Thus, the traversal result of the full binary tree traversed by the user field generation circuit 230 is the node 15, the node 13, the node 9, the node 10, the node 14, the node 11, the node 5, the node 6 and the node 12, wherein a traversal order of the assigned nodes is the node 9, the node 10, the node 5, the node 6, the node 12.

Figure 5:
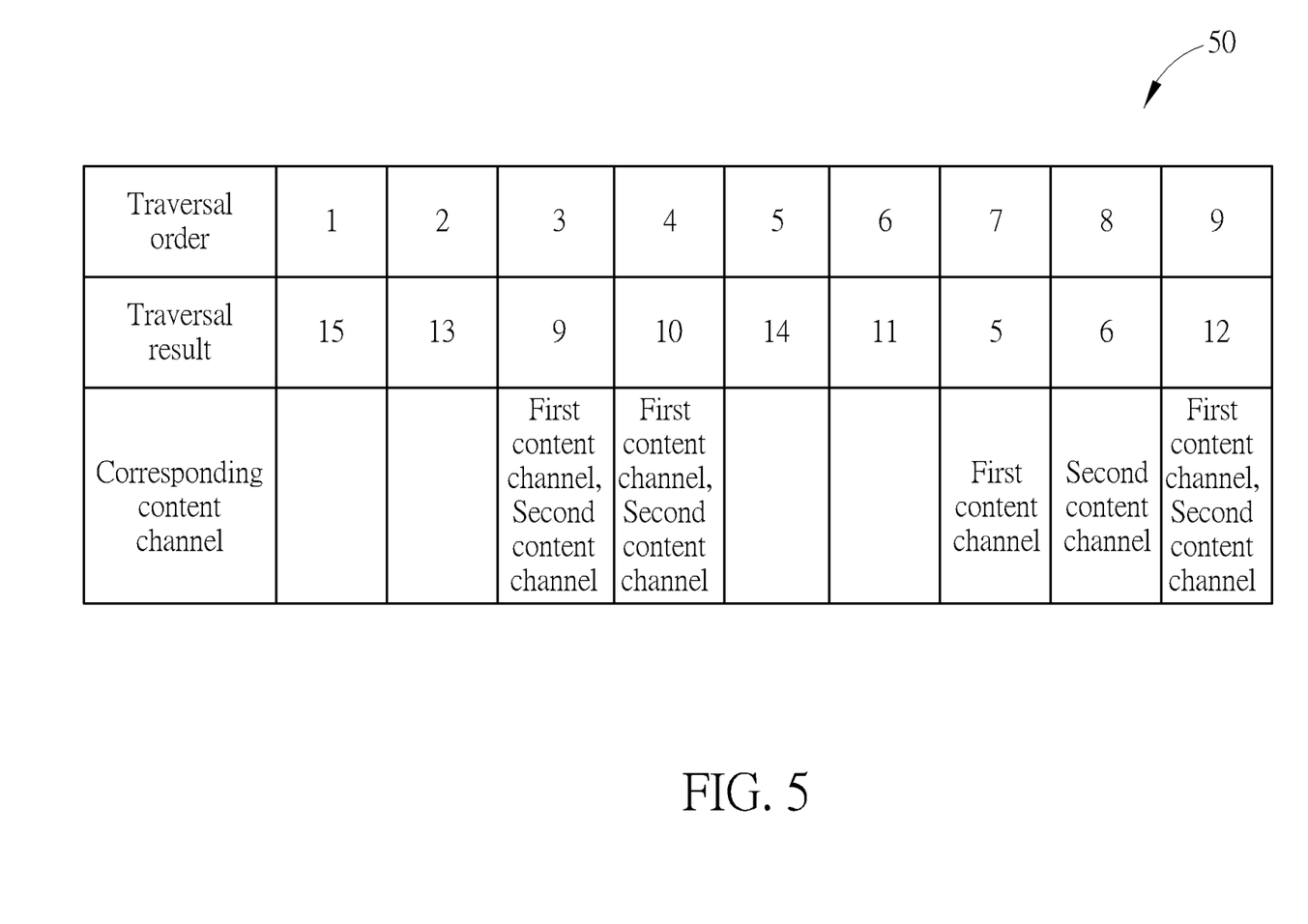
FIG. 5 is a schematic diagram of a correspondence table of a traversal order, a traversal result and content channels according to an example of the present invention.

The above correspondences of the traversal order, the traversal result and the content channels may be summarized to a correspondence table 50 in FIG. 5. The table 50 recites the assigned nodes and the corresponding first content channel and/or the second content channel.

Figure 6:
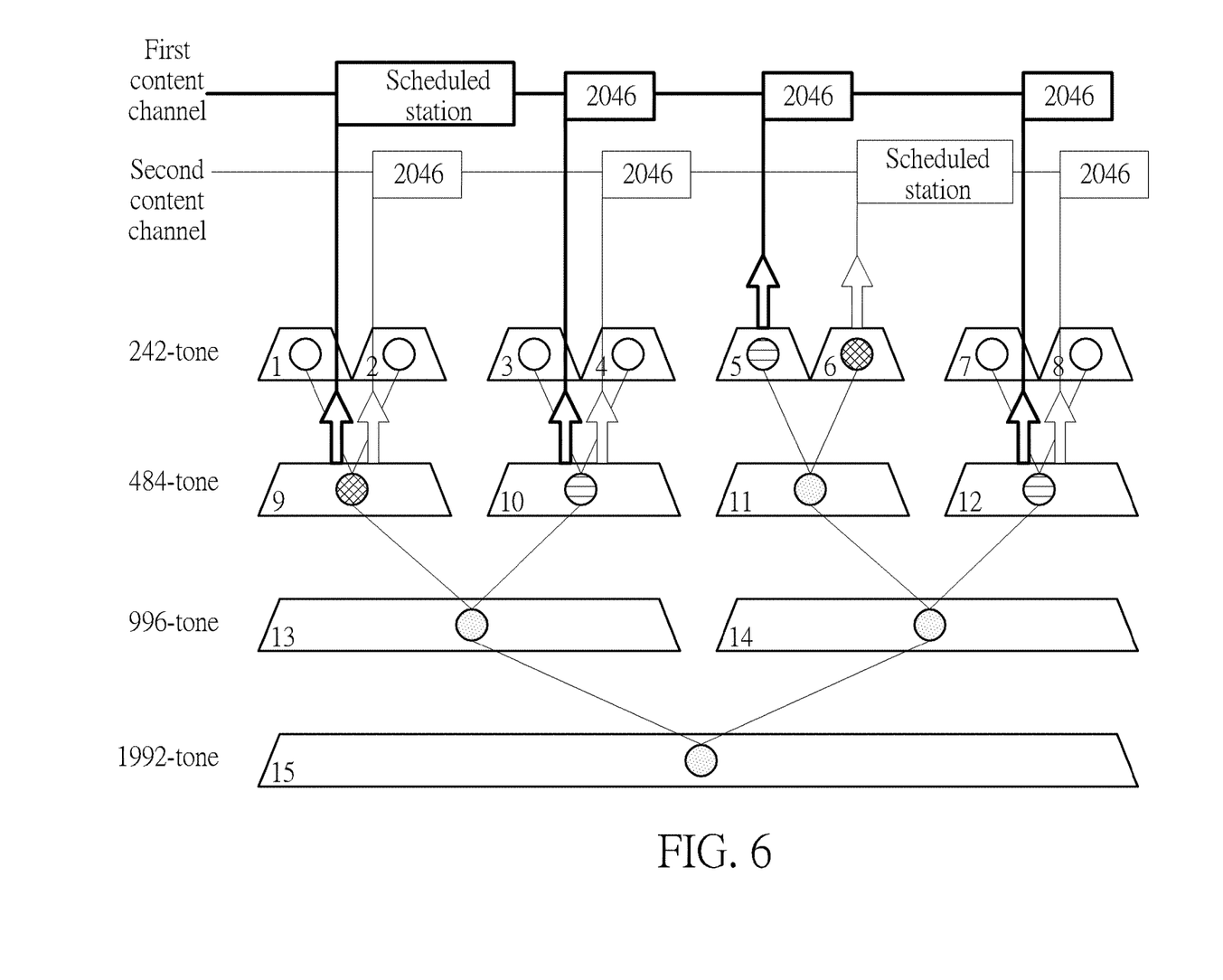
FIG. 6 is a schematic diagram of a generation of user fields according to a traversal result and content channels according to an example of the present invention.

FIG. 6 is a schematic diagram of a generation of user fields according to the traversal result and the content channels of FIG. 5 according to an example of the present invention. In FIG. 6, the resource units, their indexes and the full binary tree are illustrated the same as those in FIG. 4, and are not repeated herein. In addition, in FIG. 6, the thick arrow refers to a user field corresponding to (included in) the first content channel, and the thin arrow refers to a user field corresponding to (included in) the second content channel. "2046" referred to the user field are used for an empty (i.e., not scheduled) station. As shown in the FIG. 6, the first content channel is corresponding to (includes) one user field of the node 9 (e.g., used for the scheduled station), one user field of the node 10, one user field of the node 5, and one user field of the node 12. The second content channel is corresponding to (includes) another user field of the node 9, another user field of the node 10, one user field of the node 6 (e.g., used for the scheduled station), and another user field of the node 12.

Figure 7:
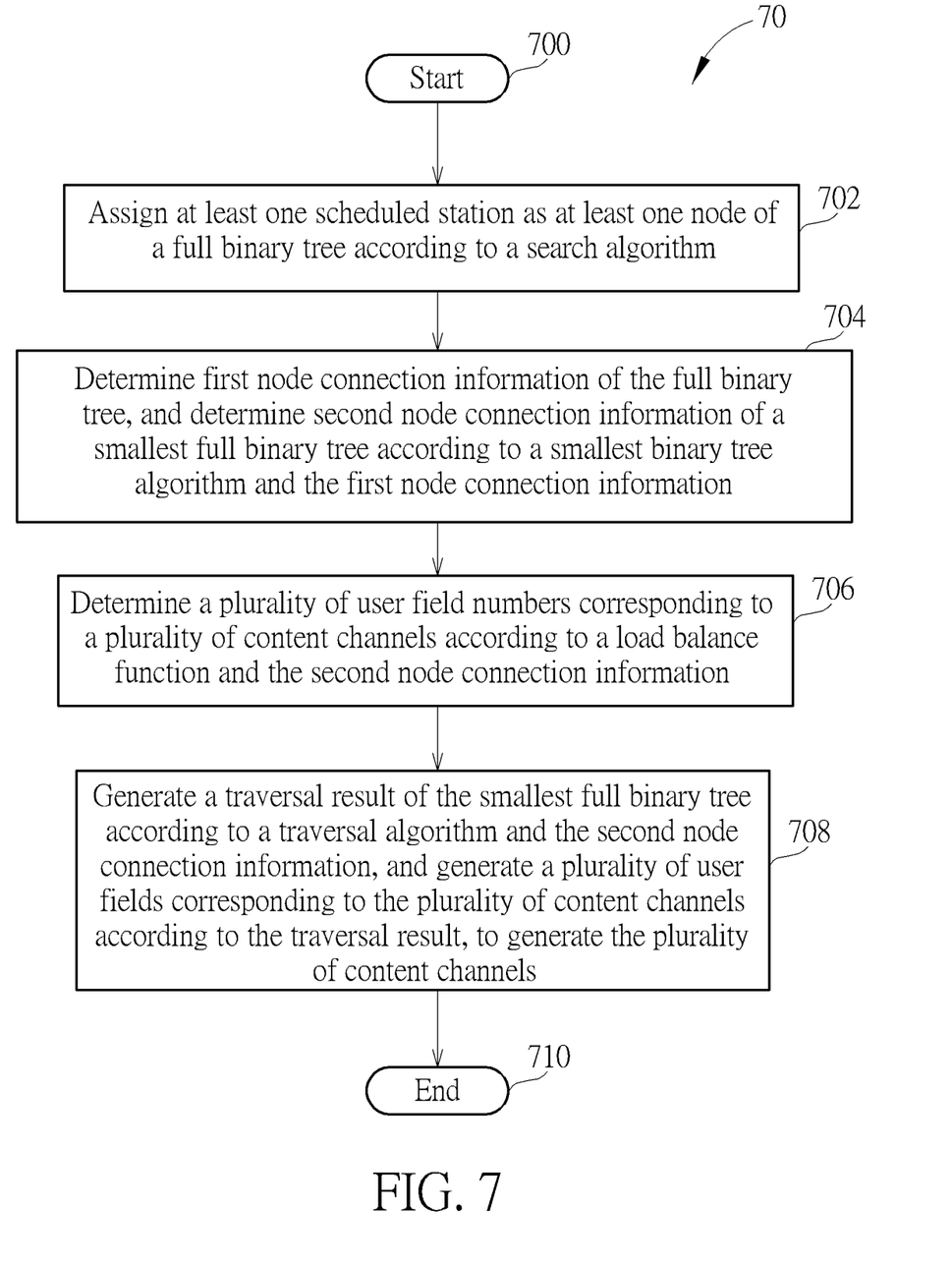
FIG. 7 is a flowchart of a process according to an example of the present invention.

Operations of the content channel generation device 20 in the above examples can be summarized into a process 70 shown in FIG. 7. The process 70 includes the following steps:

Step 700: Start.
Step 702: Assign at least one scheduled station as at least one node of a full binary tree according to a search algorithm.
Step 704: Determine first node connection information of the full binary tree, and determine second node connection information of a smallest full binary tree according to a smallest binary tree algorithm and the first node connection information.
Step 706: Determine a plurality of user field numbers corresponding to a plurality of content channels according to a load balance function and the second node connection information.
Step 708: Generate a traversal result of the smallest full binary tree according to a traversal algorithm and the second node connection information, and generate a plurality of user fields corresponding to the plurality of content channels according to the traversal result, to generate the plurality of content channels.
Step 710: End.

The process 70 is used for illustrating the operations of the content channel generation device 20. Detailed description and variations of the process 70 can be referred to the previous description, and is not narrated herein.

It should be noted that realizations of the content channel generation device 20 (including the resource unit assignment circuit 200, the node computing circuit 210, the load balance circuit 220, and the user field generation circuit 230) are various. For example, the devices mentioned above may be integrated into one or more devices. In addition, the content channel generation device 20 may be realized by hardware (e.g., circuit), software, firmware (known as a combination of a hardware device, computer instructions and data that reside as read-only software on the hardware device), an electronic system or a combination of the devices mentioned above, but is not limited herein.

To sum up, the present invention provides a device and a method of performing the content channel generation. According to the search algorithm, the smallest binary tree algorithm, the load balance function and the traversal algorithm with low complexities, the transmitter TX may generate the user fields with a short length and the content channels with a short length more efficiently, and to generate the HE-SIG-B field with a short length.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A content channel generation device, comprising:
a resource unit assignment circuit, for assigning at least one scheduled station as at least one node of a full binary tree according to a search algorithm;
a node computing circuit, coupled to the resource unit assignment circuit, for determining first node connection information of the full binary tree, and to determine second node connection information of a smallest full binary tree according to a smallest binary tree algorithm and the first node connection information;
a load balance circuit, coupled to the node computing circuit, for determining a plurality of user field numbers corresponding to a plurality of content channels according to a load balance function and the second node connection information; and
a user field generation circuit, coupled to the load balance circuit and the node computing circuit, for generating a traversal result of the smallest full binary tree according to a traversal algorithm and the second node connection information, and for generating a plurality of user fields corresponding to the plurality of content channels according to the traversal result, to generate the plurality of content channels.

2. The content channel generation device of claim 1, wherein the search algorithm comprises a binary tree search algorithm.

3. The content channel generation device of claim 1, wherein the at least one node comprises at least one non-empty node.

4. The content channel generation device of claim 3, wherein the resource unit assignment circuit assigns a plurality of empty stations as a plurality of empty leaf nodes of the full binary tree according to the search algorithm and the at least one non-empty node.

5. The content channel generation device of claim 4, wherein the node computing circuit performs following operations according to the smallest full binary tree algorithm:

the node computing circuit merges a first empty leaf node of the plurality of empty leaf nodes into the at least one non-empty node, if a first parent node connected with the first empty leaf node is the at least one non-empty node;

the node computing circuit merges a second empty leaf node of the plurality of empty leaf nodes into a second parent node connected with the second empty leaf node and determines the second parent node as a first assigned empty node, if the second parent node is not the at least one non-empty node and the second parent node does not connect to the at least one non-empty node; and the node computing circuit determines a third empty leaf node of the plurality of empty leaf nodes connected with a third parent node as a second assigned empty node, if the third parent node is not the at least one non-empty node and the third parent node connects to the at least one non-empty node.

6. The content channel generation device of claim 4, wherein the node computing circuit determines the smallest full binary tree according to the at least one non-empty node and the plurality of empty leaf nodes.

7. The content channel generation device of claim 1, wherein the plurality content channels comprises at least one first content channel and at least one second content channel.

8. The content channel generation device of claim 7, wherein the at least one first content channel comprises at least one first user field of the plurality of user fields, and the at least one second content channel comprises at least one second user field of the plurality of user fields.

9. The content channel generation device of claim 1, wherein the traversal algorithm comprises a binary tree pre-order traversal algorithm.

10. The content channel generation device of claim 1, wherein an order of a plurality of frequencies corresponding to the plurality of user fields is an ascending order.

* * * * *